Sept. 16, 1924.
H. F. KUEHN
APPARATUS FOR APPLYING INSECTICIDES
Filed April 18, 1922
1,508,749
2 Sheets-Sheet 1
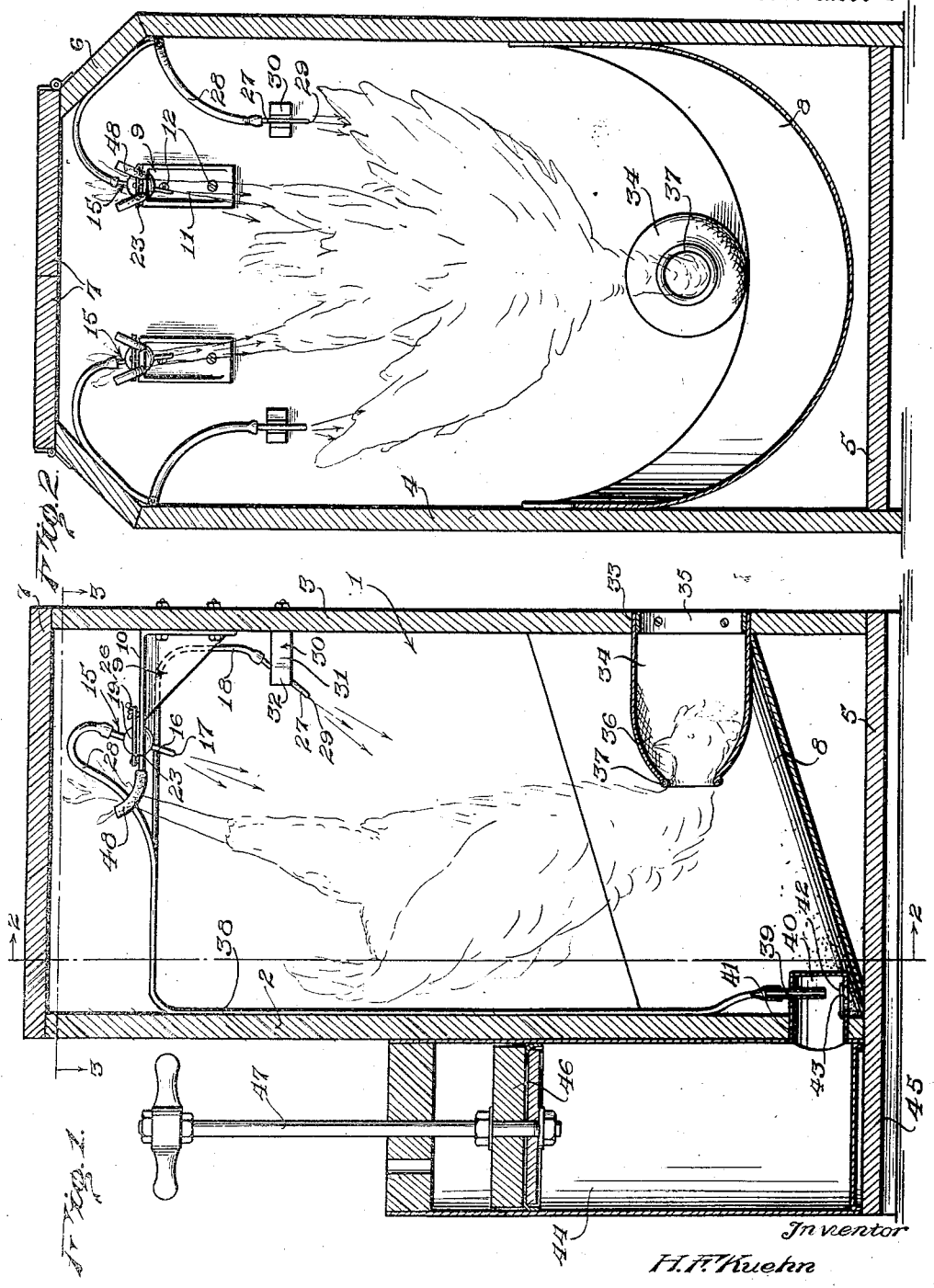

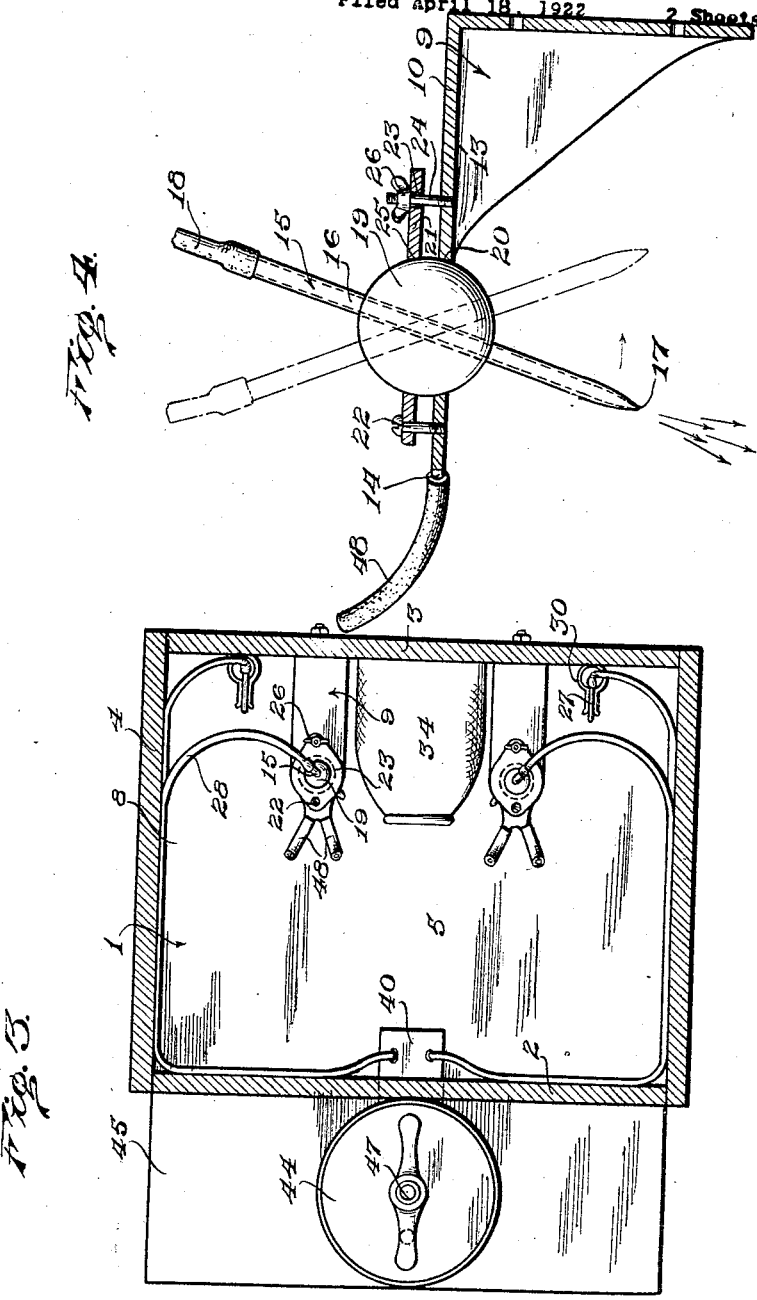

Patented Sept. 16, 1924.

1,508,749

UNITED STATES PATENT OFFICE.

HENRY F. KUEHN, OF SEATTLE, WASHINGTON.

APPARATUS FOR APPLYING INSECTICIDES.

Application filed April 18, 1922. Serial No. 554,712.

*To all whom it may concern:*

Be it known that I, HENRY F. KUEHN, a citizen of the United States, residing at Seattle, in the county of King and State of Washington, have invented certain new and useful Improvements in Apparatus for Applying Insecticides, of which the following is a specification.

This invention relates to improvements in apparatus for exterminating vermin on fowls.

One of the primary objects of the invention is to provide means whereby the fowl to be treated may be readily suspended and an insecticide blown onto the body in such a direction and manner as to most effectually serve its purpose, and the treatment generally effected without annoyance or inconvenience to the attendant.

Another object of the invention is to provide means for exposing the head of the fowl to the atmosphere during the process of treatment so that the insecticide employed will not prove injurious to the respiratory organs.

It is a well known fact that in applying insecticide to a fowl the principal parts to be treated are the thighs and the sides of the body beneath the wings, and therefore it is a further object of the present invention to provide means whereby the fowl may be suspended in such a position as to best expose these parts for treatment.

Another object of the invention is to provide a novel arrangement of nozzles for spraying the insecticide and a novel means for supporting the nozzles so that they may be suitably adjusted to direct their blasts against the thighs and body of the fowl in a manner to most effectually distribute the insecticide among the feathers and thus render the treatment most effective.

Another object of the invention is to provide means whereby the insecticide will be taken up in regulated quantities from a suitably stored supply thereof and distributed in the most effective manner.

In the accompanying drawings:

Figure 1 is a vertical front to rear sectional view through the apparatus embodying the invention;

Figure 2 is a vertical transverse sectional view on the line 2—2 of Figure 1;

Figure 3 is a horizontal sectional view taken substantially on the line 3—3 of Figure 1; and Figure 4 is an enlarged detail vertical sectional view through one of the hangers or suspension members and the parts associated therewith. The apparatus embodies essentially a cabinet which is indicated in general by the numeral 1 and which comprises a front wall 2, a rear wall 3, side walls 4, a bottom 5, and a top 6, the latter including hinged doors 7 which may be swung open to permit of introduction and removal of the fowl and which when closed served to completely close the top of the cabinet. The cabinet may be constructed of any suitable material and of any desired size and is preferably provided interiorly with a false bottom which is indicated by the numeral 8 and which is preferably of sheet metal and of arcuate form, being disposed to extend from side to side of the interior of the cabinet and between the front and back walls thereof. This false bottom is furthermore preferably inclined downwardly from the rear wall 3 to the front wall 2 and at its lower portion may rest upon the bottom 5 of the cabinet.

In order that a fowl may be suspended within the cabinet for treatment, hangers 9 are provided and each comprises a bracket 10 having an attaching portion 11 secured as at 12 to the inner face of the rear wall 3 near the top thereof. Each bracket further includes a horizontally inwardly extending supporting portion 13 which at its end is provided with a pair of gripping fingers 14 which are curved upwardly and laterally outwardly from each other and which form between them a fork or kerf in which the feet of the fowl may be engaged and the fowl thus suspended. These suspension members 9 are so spaced that when the fowl is suspended therefrom the thighs will be spread apart in a manner to expose all portions thereof to the blast of insecticide from certain of the nozzles previously referred to. These nozzles are associated with the suspension members 9 and are indicated in general by the numeral 15. Each nozzle comprises a tubular nozzle member 16 provided at one end with a tip 17 the member having attached to its other end a flexible hose 18 through which the insecticide is delivered. The nozzle tube 16 is fitted diametrically through a spherical supporting head 19 which is disposed for revoluble adjustment upon a seat 20 formed in the upper side of the supporting portion 13 of the respective suspension member 9. A cap plate 21 is swiveled as at 22 to the said portion 13 of the suspension member at one side of the head 19 and is provided at the other side of the said head with an opening 23 through which projects a threaded stem 24 projecting upwardly from the said portion 13. A seat or opening 25 is formed in the cap plate 21 and embraces the upper side of the spherical head 19, and a wing nut 26 is threaded onto the stem 24 and may be tightened so as to cause the wall of the seat of the cap plate to bind frictionally against the surface of the head 19 and thus frictionally confine the head between the cap plate and the seat 20 in the said portion 13 of the supporting member. In this manner the nozzle tubes 16 are supported for substantially universal angular adjustment and therefore their tips 17 may be presented in any direction desired. In general the nozzle tubes will be adjusted so that they will be inclined downwardly and forwardly pointing toward the thighs of the fowl suspended from the members 9.

The numeral 27 indicates other nozzle tubes similar to the tubes 16 and having connected to their upper ends flexible hose 28 and provided at their lower ends with tips 29. In supporting these tubes 27, spring clips 30 are preferably secured upon the inner side of the rear wall 3 of the cabinet below the supporting members 9 and each of the spring clips preferably comprises a bowed body portion 31 from which extend spring jaws 32 between which the respective nozzle tube is frictionally fitted and retained, the tube being in this manner supported for angular adjustment in a vertical plane and being therefore adapted to have its discharge end presented toward the adjacent side of the body and the adjacent wing of the fowl suspended within the cabinet.

In order that the head of the fowl may be protected during the spraying operation and injury to the respiratory organs thus avoided, an opening 33 is formed in the lower portion of the rear wall 3 of the cabinet, and one end of a flexible hood 34 is disposed within this opening and retained in place by any suitable means as for example a hoop or band 35. The hood 34 may be of cloth or any other flexible material and it extends into the lower portion of the cabinet above the false bottom 8 and is contracted at its free end as at 36 and provided with an elastic constricting band 37 adapted to be fitted snugly about the neck of the fowl, the head being received within the hood and thus exposed to the atmosphere through the opening 33.

The tubes 18 and 28 constitute branches from supply tubes or hose 38 which are fitted at their intake ends onto tubes 39 which extend downwardly into a casing 40 arranged within an opening 41 in the lower portion of the front wall 2 of the cabinet immediately above the lower portion of the false bottom 8. The casing 40 is provided in its under side with an opening 42, and a flap valve 43 is arranged within the casing and normally closes the said opening. The casing is placed in communication with the lower portion of the cylinder 44 of an air pump which is mounted upon an extension 45 of the bottom 5 of the cabinet and extends vertically beside the front wall 2. A piston 46 is arranged to operate in the cylinder 44 and is provided with an operating handle 47 by means of which it may be reciprocated.

In the use of the apparatus the fowl to be treated is suspended within the cabinet with the head fitting into the hood 34, a suitable quantity of powdered insecticide having been introduced into the cabinet and setting by gravity upon the lowermost portion of the false bottom 8 and therefore about the casing 40. Upon the up-stroke of the piston 46, the valve 43 will be opened and a quantity of the insecticide will be drawn by suction into the casing 40, and upon downward movement of the piston, the valve 43 will be closed and the insecticide will be blown through the tubes 39, hose 38 and branches 18 and 28, and from the nozzle tubes onto the body of the fowl.

Preferably the gripping fingers 14 will be provided with cushioning and protecting sheaths 48 which may comprise short lengths of rubber tubing.

Having thus described the invention what is claimed as new is:

1. In apparatus of the class described, means for suspending a fowl in head-down position, and insecticide blast means supported adjacent the suspension means and arranged to direct the blast in a general downward direction against the body of the fowl.

2. In apparatus of the class described, spaced members for engagement by the legs of a fowl whereby to suspend the fowl in a head-down position with the legs relatively separated, and insecticide blast means supported adjacent the suspension means and arranged to direct the blast in a general downward direction against the thighs and body of the fowl.

3. In apparatus of the class described, spaced suspension members for engagement by the legs of a fowl whereby the fowl will be suspended in a head-down position with the legs relatively separated, and insecticide blast means mounted upon each of said suspension members and positioned to direct the blast in a general downward direction against the thighs of the fowl.

4. In apparatus of the class described, spaced suspension members for engagement by the legs of a fowl whereby the fowl will be suspended in a head-down position with the legs relatively separated, and insecticide blast means adjacent each of said suspension members and positioned to direct the blast in a general downward direction against the thighs of the fowl, the blast means being angularly adjustable to vary the direction of blast.

5. In apparatus of the class described, spaced suspension members for engagement by the legs of a fowl whereby to suspend a fowl in a head-down position, insecticide blast means supported adjacent the suspension members and arranged to direct the blast in a general downward direction against the thighs of the fowl, and other blast means supported below the suspension members and arranged to direct the blast against the sides of the body of the fowl.

6. In apparatus of the class described, a suspension means comprising a supporting member having a fork to receive the leg of a fowl to be suspended in head-down position, and an insecticide blast nozzle angularly adjustably supported upon the said support whereby the blast therefrom may be directed in a general downward direction against the thighs of the suspended fowl.

7. In apparatus of the class described, an enclosure, means within the enclosure for suspending a fowl therein in head-down position, the enclosure having an opening in the lower portion of one wall, a flexible hood extending within the enclosure from the opening and communicating with the atmosphere and having an elastically restricted mouth to encompass the neck of a fowl with the head received within the hood, and means within the upper portion of the enclosure for directing an insecticide against the body of the fowl.

8. In apparatus of the class described, an enclosure, means within the enclosure for suspending a fowl therein, the bottom portion of the enclosure constituting a storage space for insecticide, and means operable to take up insecticide from said space and deliver the same against the body of the suspended fowl, the said means comprising an enclosed chamber at the bottom of the storage space into which the insecticide is to be drawn from the storage space and from which it is to be discharged above the storage space, means for conducting the insecticide from the chamber to the point of delivery, and means for successively creating suction and compression in said chamber.

In testimony whereof, I affix my signature.

HENRY F. KUEHN. [L. S.]